(No Model.)
J. B. MARSHALL.
HAME TUG.
No. 434,937.  Patented Aug. 26, 1890.
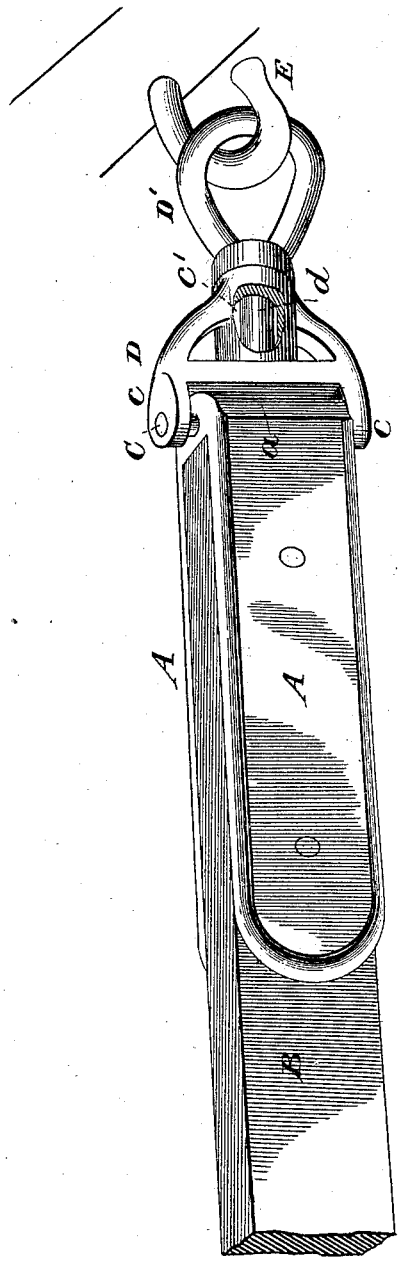
Witnesses.
A. Ruppert,
H. A. Daniels
Inventor.
John B. Marshall
Per
Thomas K Simpson
atty

UNITED STATES PATENT OFFICE.

JOHN B. MARSHALL, OF WHITE PINE, PENNSYLVANIA.

HAME-TUG.

SPECIFICATION forming part of Letters Patent No. 434,937, dated August 26, 1890.

Application filed April 12, 1890. Serial No. 347,612. (No model.)

*To all whom it may concern:*

Be it known that I, JOHN B. MARSHALL, a citizen of the United States, residing at White Pine, in the county of Lycoming and State of Pennsylvania, have invented certain new and useful Improvements in Cockeyes for Traces; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a cockeye for connecting a trace with a whiffletree-hook, so that that the eye may be readily attached to the hook and then turned to prevent its escape therefrom; also to make the connection jointed, so that the trace may turn at an angle to the cockeye, and thus not have any tendency to break the hook or eye or separate them.

I will first describe the invention in connection with the drawing, and then point it out in the claim.

The drawing is a perspective view.

In the drawing, A represents the clip, which is made to embrace the rear end of a trace B, and is riveted thereto. At the junction of the two arms of the clip A, I make a perforation, hole, or bearing $a$, in which turns the pivot C of the frame D, said pivot being fast in the ears $c\ c$ and occupying a vertical position in the same plane with the trace B. In the middle of the frame C, I make a horizontal hole or bearing $c'$, in which is swiveled the shank of the cockeye D', said shank $d$ being first passed through the bearing and then upset at the ends so as to form a head, which preferably fits into a correspondingly-shaped countersink. By having the trace-clip A pivoted to the frame C the trace can turn in a horizontal plane as far as the horse can carry it laterally without pulling the cockeye D' against the whiffletree-hook E; also by having the eye D' swiveled to turn in a vertical plane on the frame C it can be quickly adjusted with the hand to go on or off the hook, thus rendering it unnecessary to twist the trace in order to apply it to the hook or to remove it.

What I claim as new, and desire to protect by Letters Patent, is—

A trace-cockeye consisting of the loop D', frame D, and clip A, the loop D' being provided with a shank $d$, swiveled in the frame D, and the said frame being connected by a pivot C with the clip A, as shown and described.

In testimony whereof I affix my signature in presence of two witnesses.

JOHN B. MARSHALL.

Witnesses:
W. P. ENGLAND,
W. T. ENGLAND.